June 30, 1942. P. F. SPERRY 2,288,148
INTERMITTENT FILM FEEDING MEANS
Original Filed Oct. 29, 1938
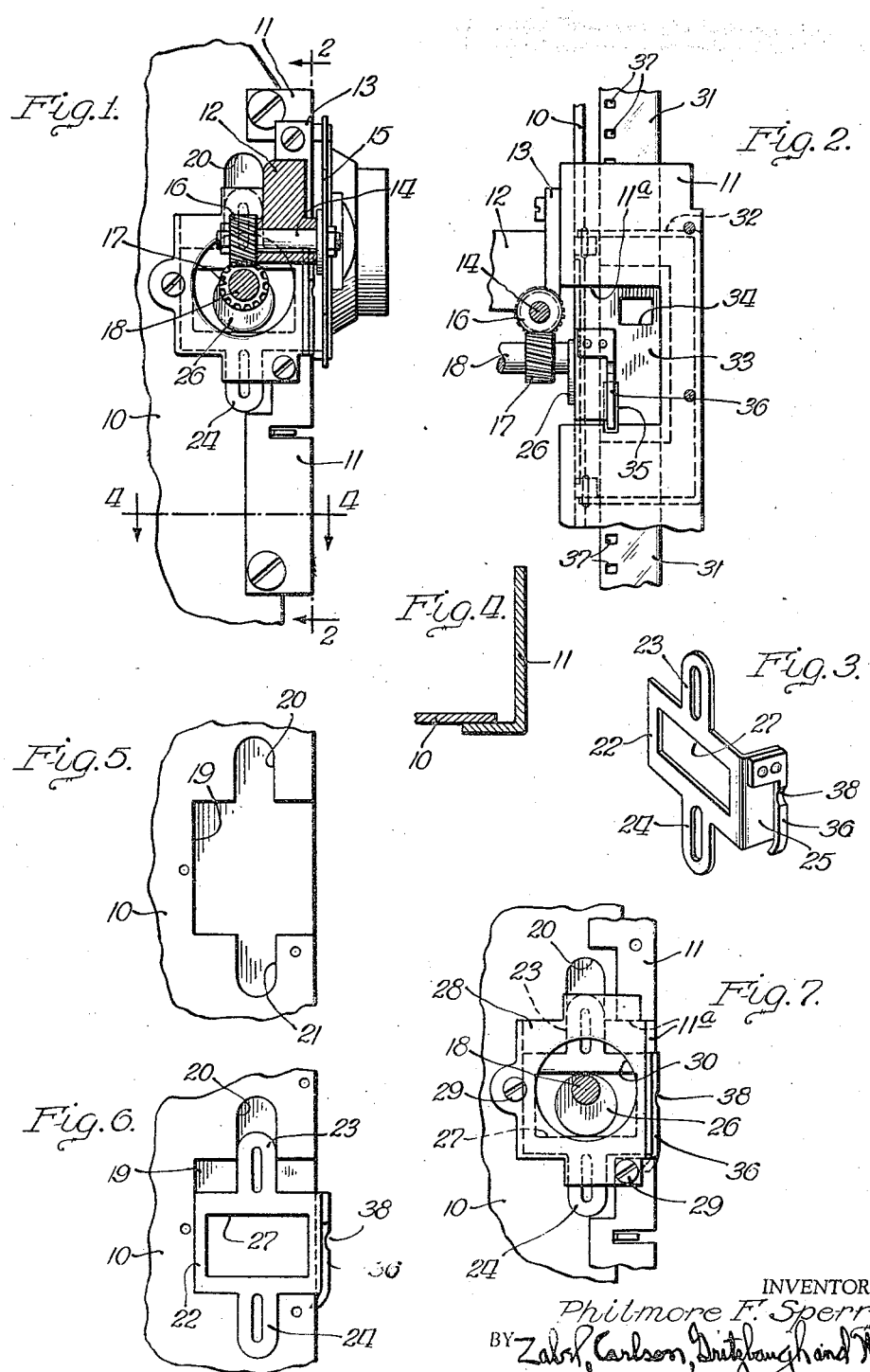
INVENTOR,
Philmore F. Sperry
BY Zabel, Carlson, Gritzbaugh and Wiles,
Attys.

Patented June 30, 1942

2,288,148

UNITED STATES PATENT OFFICE 2,288,148

INTERMITTENT FILM FEEDING MEANS

Philmore F. Sperry, Chicago, Ill., assignor to Revere Camera Company, Chicago, Ill., a corporation of Delaware Original application October 29, 1938, Serial No. 237,667. Divided and this application August 2, 1940, Serial No. 349,397

3 Claims. (Cl. 88—18.4)

This application is being filed as a division of my co-pending application, Serial No. 237,667, filed October 29, 1938, which has later matured into Letters Patent No. 2,214,185, granted September 10, 1940.

The invention relates to intermittent film feeding means for use in connection with moving picture cameras or other devices in which films are used and in connection with which it is necessary to give the film intermittent movement for permitting the film to be held stationary for exposure, or for the passage of a beam of light therethrough for projection purposes. It is the object of the invention to provide an improved form and arrangement of parts by which the film shall be given a smooth and easy movement, so as to cut down to a minimum wear and tear on the film.

In the arrangement by which I have accomplished my objects, an actuating member in the form of a frame having two arms standing at right angles to each other is used, the detent by which the film is actuated being mounted upon one of such arms, and the arrangement being such that the detent is held very firmly in its operative position so as to work smoothly with its co-operating parts. The power for moving the actuating member is applied to the other arm of the frame at a substantial distance from the film and the shutter, the arrangement being such as to enable the shutter to be mounted to operate as close as possible to the film.

It is another object of this invention to improve devices of this type in sundry details hereinafter pointed out. The preferred means by which the several objects have been attained are illustrated in the accompanying drawing, in which—

Fig. 1 is a side face view of a portion of the reel chamber of a camera embodying my improved construction with certain of the parts shown in vertical section;

Fig. 2 is a vertical sectional view taken substantially at the line 2—2 of Fig. 1;

Fig. 3 is a perspective view of the actuating member by which power is applied to a film;

Fig. 4 is a horizontal sectional view taken substantially at the line 4—4 of Fig. 1;

Fig. 5 is a face view of the portion of the partition as shown in Fig. 1, but with the co-operating parts removed;

Fig. 6 is a view similar to Fig. 5, but showing my improved actuating member in position; and Fig. 7 is a view similar to Fig. 6, but including additional supporting and operating parts.

Referring now to the several figures of the drawing, in which corresponding parts are indicated by the same reference characters, 10 indicates an interior partition of a camera casing, by which the chamber for the film and its mounting reels (at the right in Fig. 2) is separated from the chamber in which the motor and the greater portion of the operating mechanism is mounted (at the left in said Fig. 2). As best shown in Fig. 4, the partition 10 is provided at its front edge with a heavy angular plate 11, from which a heavy cross bar 12 is supported by means of a lug 13. Upon the bar 12, a short shaft 14 is rotatably mounted, provided with a shutter 15 on its front end for controlling the passage of light into the camera, and with a gear 16 at its rear end meshing with a gear 17 carried by a shaft 18 which is driven by any suitable means from the usual motor of the camera.

As is clearly shown in Fig. 5, the face of the partition 10 is cut out to provide a recess 19 having an upward extension 20 and a downward extension 21, the recess being of such size and shape as to receive slidably in position therein the long arm 22 of my improved actuating member, such arm 22 being provided with an upwardly extending lug 23 and a downwardly extending lug 24 having a snug sliding fit in the extensions 20 and 21 of the recess 19. As is best shown by Figs. 2 and 7, the heavy angle plate 11 is cut out at its middle portion so as to provide an opening 11—a in the form of a notch for permitting the actuating member to slide up and down in the recess 19, with the shorter arm 25 extending around the corner of the angle plate.

For operating the actuating member comprising the arms 22 and 25 an eccentric disk 26 is mounted fixedly in position on the shaft 18 engaging an oblong opening 27 in the longer arm 22, the arrangement being such that the actuating member is reciprocated vertically upon rotary movement of shaft 18 and eccentric 26. The construction is such that the actuating member is given a simple, harmonic movement with comparatively long slow motion periods at the top and at the bottom of the throw. For holding the actuating member firmly in position during this reciprocatory movement, I have provided a retaining plate 28 held in position by screws 29, such plate having a large circular opening 30 therein so as to permit the eccentric to have free movement without interference.

In the arrangement shown, a film 31 is movable between a pivotally mounted member 32 which is located behind the film and a plate 33 located in front of the film, the plate 33 being provided with an opening 34 therethrough for the passage of the light beam by which exposure is effected. The plate 33 is also provided with a vertically disposed slot 35, through which a spring pawl or arm 36 extends into engagement with successive openings 37 in the film 31, the pawl or arm being mounted on the short arm 25 of the actuating member. As is best shown in Fig. 3, the pawl or arm 36 is made comparatively thin at 38, so as to adapt the lower end portion of the pawl to yield readily in a forward direction so as to be movable easily into and out of operative engagement with the openings 37 of the film. The arrangement is such that when the angular actuating member comprising the arms 22 and 25 is moved downwardly the pawl 36 engages one of the openings 37 in the film so as to move the film downwardly; when thereafter the actuating member is moved upwardly, the pawl 36 is easily and smoothly disengaged from the film and is moved into position for easy, smooth engagement with the next adjacent higher opening 37 of the film.

With the operating mechanism for giving the actuating member its operative movements all located adjacent to the arm 22 of the actuating member, the shutter 15 is enabled to operate in very close proximity to the film so as to be very effective for shutting off the light from the film during the normal movement period of the film. With the actuating member in the form of an angle whose longer arm has snug sliding engagement with the partition plate 10 and whose shorter arm is reciprocated along the front face of the plate 33, a very even movement of said actuating member is assured for moving the film with a minimum of wear on the openings 37.

While I prefer to employ the form and arrangement of parts as shown in the drawing and as above described, it is to be understood that the invention is not to be limited thereto except so far as the claims may be so limited, it being understood that changes might well be made in the form and arrangement of the parts without departing from the spirit of the invention.

I claim:

1. In a mechanism of the type described, the combination of a frame plate, a second plate rigidly mounted at right angles to said first-named plate and having an opening therein past which a film may be moved in face engagement with the second plate, an angular actuating member extending about the corner formed by said two plates with one arm slidably mounted on the outer face of said first-named plate and with the other arm extending substantially to the path of the film along the second plate, a retaining plate mounted on the outer face of said first-named plate adapted in cooperation with said first-named plate to provide a recess in which said one arm of said angular actuating member is slidably mounted so as to be held firmly against angular movement in any direction with respect to said first-named plate, means located at the outer face of said first-named plate in an opening in said retaining plate adapted by operative engagement with said one arm to reciprocate said actuating member, and yielding means carried by said actuating member in position to extend through said opening in the second plate adapted by engagement with openings in a film to give the film a step by step movement along the face of the second plate.

2. In a mechanism of the type described, the combination of a frame plate, a second plate at right angles to said first-named plate and cut out at an intermediate portion vertically for providing a large notch adjacent to said first-named plate, one of said plates having its edge portion turned at an angle and rigidly connected with the other plate, a thin metal plate extending across said notch on the inner face of said second plate and having an exposure opening therein past which a film may be led, a pivotally mounted member for holding a film in engagement with the face of said third plate, an angular actuating member extending about the corner formed by said first-named plate and said third plate with one arm slidably mounted on the outer face of said first-named plate and with the other arm extending substantially to the path of the film along the third plate, means for holding said angular actuating member in snug sliding engagement with said plate, means located at the outer face of said first-named plate adapted by operative engagement with said one arm to reciprocate said actuating member, and yielding means carried by said actuating member in position to extend through a slot in said third plate adapted by engagement with openings in a film to give the film a step by step movement along the face of said third plate.

3. In a mechanism of the type described, the combination of a frame plate having a recess in one face with upwardly and downwardly directed extensions of the recess communicating therewith, a second plate rigidly mounted at right angles to said first-named plate and having an opening therein past which a film may be moved in face engagement with the second plate, an angular actuating member extending about the corner formed by said two plates with one arm slidably mounted in said recess and with the other arm extending substantially to the path of the film along the second plate, upwardly and downwardly extending lugs on said one arm of the actuating member in snug sliding engagement with the upwardly and downwardly directed extensions, a retaining plate mounted on said first-named plate for holding said actuating member slidably in position thereon, means located at the outer face of said first-named plate adapted by operative engagement with said one arm to reciprocate said actuating member, and yielding means carried by said actuating member in position to extend through said opening in the second plate adapted by engagement with openings in a film to give the film a step by step movement along the face of said second plate.

PHILMORE F. SPERRY.